United States Patent [19]

Feiman et al.

[11] 4,247,609
[45] Jan. 27, 1981

[54] LITHIUM CHLORINE BATTERY CONTAINING IODINE TRICHLORIDE CATHODE AND IODINE MONOCHLORIDE ELECTROLYTE

[75] Inventors: Vladimir Feiman, Roseville; Eugene Luksha, Golden Valley, both of Minn.

[73] Assignee: Cardiac Pacemakers, Inc., St. Paul, Minn.

[21] Appl. No.: 136,439

[22] Filed: Apr. 2, 1980

Related U.S. Application Data

[63] Continuation-in-part of Ser. No. 106,867, Dec. 26, 1979, abandoned.

[51] Int. Cl.³ .................................................. H01M 6/14
[52] U.S. Cl. ..................................... 429/194; 429/199; 429/218
[58] Field of Search .............. 429/101, 102, 199, 218, 429/194, 197

[56] References Cited

U.S. PATENT DOCUMENTS

| | | | |
|---|---|---|---|
| 4,128,703 | 12/1978 | Mead et al. | 429/101 |
| 4,135,519 | 1/1979 | Greatbatch | 429/199 X |

Primary Examiner—Charles F. LeFevour
Attorney, Agent, or Firm—Orrin M. Haugen; Thomas J. Nikolai

[57] ABSTRACT

A primary electrochemical cell comprising a lithium anode, an iodine trichloride cathode, and a compatible non-aqueous electrolyte consisting of iodine monochloride.

3 Claims, 2 Drawing Figures

LITHIUM CHLORINE BATTERY CONTAINING IODINE TRICHLORIDE CATHODE AND IODINE MONOCHLORIDE ELECTROLYTE

CROSS-REFERENCE TO RELATED APPLICATION

This is a Continuation-in-Part application of our copending application Ser. No. 106,867, filed Dec. 26, 1979, now abandoned, entitled "LITHIUM CHLORINE BATTERY CONTAINING IODINE TRICHLORIDE CATHODE AND IODINE MONOCHLORIDE ELECTROLYTE", and assigned to the same assignee as the present invention.

BACKGROUND OF THE INVENTION

The present invention relates generally to an improved electrochemical cell, and more specifically to such a cell utilizing a lithium anode and a non-aqueous electrolyte, and wherein the cell is capable of delivering power at a substantially constant voltage over extended periods of time.

Electrochemical cells utilizing lithium anodes have found particular utility in certain of those long-life applications in which a relatively flat voltage output is required, with a relatively low or modest current requirement. Such electrochemical cells are particularly adapted for use in delivering power over extended periods of time to devices which may be implanted within the human body, and as such, require such extended lifetimes. An example of such a device is an implantable cardiac pacer device, although other electrically powered devices such as implanted infusion pumps or the like may utilize the improved power source of the present invention.

SUMMARY OF THE INVENTION

Briefly, in accordance with the present invention, a primary electrochemical cell is provided which comprises a receptacle enclosing a lithium anode and an iodine trichloride cathode, with both being immersed in a non-aqueous electrolyte. The electrolyte consists of iodine monochloride, which is compatible with the iodine trichloride cathode. The relatively flat voltage output of cells prepared in accordance with the present invention is believed to be due to the reactions occurring between the lithium anode and the iodine trichloride cathode. The molar concentrations of the individual components within the combination are selected such that the primary reaction occurs between the lithium anode and the iodine trichloride cathode, which reaction is followed at least in part by concurrent reactions occurring between the reaction product of the iodine trichloride in its resultant reduced oxidation states. The voltage outputs are related, one to another, in order that a first modest drop in voltage will occur at a point when substantially all of the iodine trichloride available for reaction has been exhausted from the system. At a selected point in time, and depending upon the specific application, steps may be taken to replace the power source, as well as any other component of the system, which are of the type which are normally replaced along with the power source.

Therefore, it is a primary object of the present invention to provide an improved electrochemical cell which is particularly adapted for use on those applications requiring low to modest current drain, but which require a relatively flat voltage output over extended periods of time, with the improved electrochemical cell of the present invention utilizing a lithium anode and iodine trichloride cathode together with an electrolyte system consisting of iodine monochloride.

It is a further object of the present invention to provide an improved primary electrochemical cell comprising a lithium anode, an iodine trichloride cathode together with an iodine monochloride electrolyte.

Other and further objects of the present invention will become apparent to those skilled in the art upon a study of the following specification, appended claims, and accompanying drawing.

IN THE DRAWING

FIG. 1 is a front elevational view of an electrochemical cell prepared in accordance with the present invention, and which is shown partially cut away in order to expose certain of the cell components; and FIG. 2 is a detail exploded view showing the individual components of the anode as typically employed in an electrochemical cell prepared in accordance with the present invention.

DESCRIPTION OF THE PREFERRED EMBODIMENT

Figure 1:
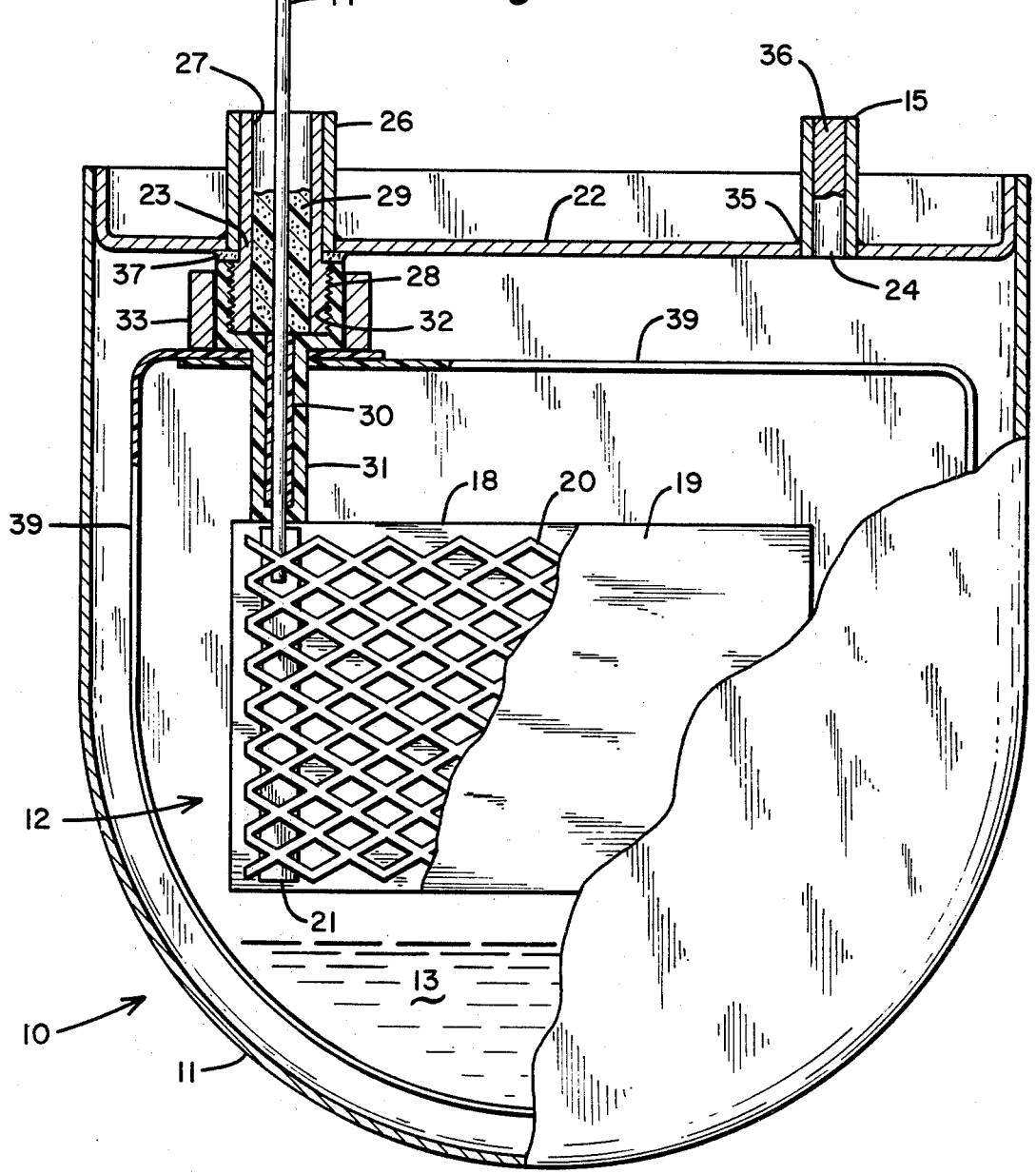

In accordance with the preferred embodiment of the present invention, a primary electrochemical cell is prepared utilizing a lithium anode together with a non-aqueous electrolyte formulation of the following general characteristics:

GENERAL CHARACTERISTICS OF EXAMPLES

Each of the cells contain a one gram lithium anode with a surface area of 15 cm$^2$ for 5.22 cc of cathode material. The total external volume of the cells in each case was 9.6 cc. Reagent or better grade chemicals were used without further treatment being required. The iodine monochloride was de-gassed for 10–15 minutes by bubbling Ar through it in an Ar filled dry box with such dry boxes being commercially available. All cell preparation and construction was also done in the dry box where the Ar atmosphere was maintained at less than 10 ppm H$_2$O, 10 ppm O$_2$ and 50 ppm N$_2$. Reference is made to the following specific examples for a more complete comprehension of the concepts of the present invention.

EXAMPLE I

| Component | Quantity |
|---|---|
| (A) Anode-lithium metal | 1 gram |
| (B) Cathode(ICl$_3$) | 8 grams |
| (C) Electrolyte(ICl) | 3 ml. |

The cell prepared in accordance with this example functioned well, delivering instantly an open circuit voltage of approximately 3.3–3.5 volts, and maintaining 2.9 volts across a 10 K ohm load. While the present structure contemplates utilizing essentially pure lithium, it will be appreciated that cells may be prepared utilizing lithium alloys, including, for example, 90:10 lithium magnesium alloys. The term "lithium" as employed herein, accordingly contemplates reference to substantially pure lithium however, it is understood that the term is used in a comprehensive sense so as to include those lithium alloys containing, for example, 10% or so of magnesium or another element.

EXAMPLE II

| Component | Quantity |
| --- | --- |
| (A) Anode-lithium metal | 1 gram |
| (B) Cathode($ICl_3$) | 8 grams |
| (C) Electrolyte(ICl) | 3 ml. |
| (D) $LiAlCl_4$ | To saturation |

The cell prepared in accordance with this Example II functioned well, initially delivering approximately 3 volts across a 10 K ohm load.

THE ELECTROLYTE

As has been indicated, the electrolyte contemplated for use in cells fabricated pursuant to the present invention is iodine monochloride. Iodine monochloride electrolytes are normally liquid at room temperature, and remain liquid at body temperature.

ASSEMBLY CONSIDERATIONS

It will be appreciated that primary electrochemical cells prepared in accordance with the present invention may utilize receptacle housings of a wide variety of configurations. Essentially, the configuration selected is dictated by the application of the cell, and the constraints placed thereupon by the specific application. The present invention is one which permits the utilization of a cell having a wide variety of potential configurations, with the cell structure being one which poses little, if any, difficulties on cell configuration.

ELECTROTLYE FORMULATIONS

As has been indicated above, the electrolye is iodine monochloride. The iodine trichloride and monochloride utilized are compatible within these ranges. Lithium aluminum chloride may be added as a solute in the electrolyte. This material is preferably present in an amount equal to saturation. However, lesser amounts, including concentrations of approximately 1 molar have been found useful.

TYPICAL CELL DESIGN

Figure 2:
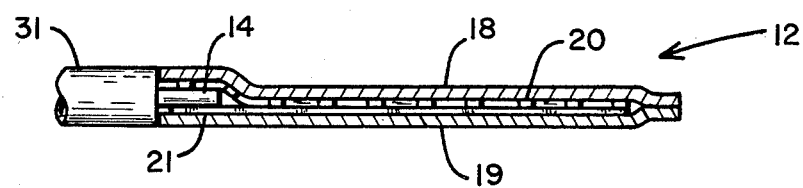

With attention now being directed to FIGS. 1 and 2 of the drawing, it will be seen that the electrochemical cell generally designated 10 comprises a receptacle or housing 11 enclosing a lithium anode generally designated 12, which is immersed in a non-aqueous electrolyte as present at 13. Means for delivering an electrical current flow from the cell are provided through terminals 14 and 15, with terminal 14 being in the form of a terminal pin, and with terminal 15 being in the form of a collapsed fill-tube assembly.

With attention being directed to FIG. 2 of the drawing, the detail structure of lithium anode 12 is shown, with the anode 12 including a total of two plates of lithium metal, including plates 18, and 19. These lithium plates are pressed together against nickel grid member 20, with grid 20 being coupled to strip 21, with the surface area of the lithium in the completed cell, as set forth in the general discussion concerning the examples, being in the area of 15 $cm^2$.

As is apparent from a review of FIGS. 1 and 2, the grid 20 comprises an expanded grid of nickel, with nickel being preferred in this application.

For most purposes, receptacle 11 is fabricated from a stainless steel, specifically No. 304L stainless, with this material being desirable for most purposes.

In preparing the finished cell, the container 11 will, of course, include a cover 22 which has a pair of spaced apart openings or bores formed therein as at 23 and 24 for receiving the terminals 14 and 15 therewithin. Terminal 15 functions as a fill-tube during preparation. In the completed assembly, the terminal pin 14 will be hermetically sealed, using an outer sleeve 26, with internal sealing components as shown. The balance of the seal assembly includes sealing sleeve 27 which has a threaded cap end or portion as at 28. Member 27 is insulatively isolated from terminal 14 by means of an inner insulating barrier as at 29, preferably glass. Inner insulating sleeve 30 is provided for the lower portion of terminal pin 14, and outwardly thereof is cup and sleeve member 31. Members 30 and 31 are preferably fabricated from an electrical insulating material such as molded polytetrafluoroethylene (Teflon), and ethylene chlorotrifluoroethylene copolymer (E-CTFE), respectively. Member 31 is internally threaded as at 32 for engagement with the lower end 28 of member 27. In order to complete the assembly, sealing sleeve 33 is provided which is press-fit over the outer circumference of the cup portion of member 31. The details of processing utilized in preparing the finished cell are set forth in the general discussion preceding the description of the specific examples hereinabove.

Terminal 15 is preferably a hollow sleeve, one end of which is bonded, such as by welding to cover 22, as at 35. After the filling operation, terminal 15 is sealed off by welding to form a suitable seal as at 36.

The technique for bonding the inner wall of member 26 to the outer wall surface of member 27 is not critical, it being understood that any suitable sealing operation may be acceptable, preferably by welding. Also, in order to assure hermetic sealing conditions, a bead of sealant is preferably provided adjacent the mating threads of the cup portion of member 31 and threaded area as at 32, with such a sealant being disposed in the zone as at 37.

The electrolyte is normally prepared prior to filling the cell, with the material being added as a liquid as one of the steps in the overall preparation, as will be more fully disclosed hereinbelow.

CELL CONSTRUCTION PROCEDURE

In preparing the cell, the sealing assembly including pin 14 is secured to sleeve member 26 which is welded to cover member 22, with sleeve member 26 providing the necessary strength for such sealing. Following this step, the fill-tube terminal 15 is welded into the cover.

Thereafter, the circumferential insulator or spacer element 39 is pierced adjacent the ends thereof and installed, together with the grid current collector 19 and lithium elements pressed thereon. These components may be spot-welded into place as required.

The individual pieces of lithium, including lithium elements 18 and 19, are installed within the circumferential insulator 39. Lithium members 19 and 20 provide conductivity for current flow from the battery assembly. The circumferential insulator 39 is placed within the cell in order to permit the electrolyte to flow and fill all areas of the cell, and make appropriate physical and electrical contact with the lithium anode.

The cap member 22, together with its completed anode appendage is then welded into receptacle chamber or body 11, and the electrolyte is then added through the fill-tube. The fill-tube is then clamped off for sealing, and the assembly is then ready for cleaning and inspection.

We claim:

1. In a primary electrochemical cell comprising a receptacle containing an anode, a cathode, and a non-aqueous electrolyte, and having means for delivering an electrical current flow therefrom;

(a) said anode consisting essentially of lithium;

(b) said cathode consisting essentially of iodine trichloride; and (c) said non-aqueous electrolyte consisting of iodine monochloride.

2. The electrochemical cell as defined in claim 1 wherein said anode comprises a lithium pellet pressed onto a nickel grid.

3. The electrochemical cell as defined in claim 1 being particularly characterized in that the volume of said electrolyte comprises up to about 50% of the volume of the cathode.

* * * * *